(12) United States Patent
Ives et al.

(10) Patent No.: US 9,236,725 B2
(45) Date of Patent: Jan. 12, 2016

(54) HYDROELECTRIC TURBINE CABLING SYSTEM

(75) Inventors: James Ives, Dublin (IE); Paul Dunne, Dublin (IE); Nick Murphy, London (GB)

(73) Assignee: Openhydro IP Limited, Dublin (IE)

( * ) Notice: Subject to any disclaimer, the term of this patent is extended or adjusted under 35 U.S.C. 154(b) by 12 days.

(21) Appl. No.: 13/498,631

(22) PCT Filed: Sep. 29, 2010

(86) PCT No.: PCT/EP2010/064459
§ 371 (c)(1),
(2), (4) Date: Jul. 26, 2012

(87) PCT Pub. No.: WO2011/039255
PCT Pub. Date: Apr. 7, 2011

(65) Prior Publication Data
US 2012/0280506 A1    Nov. 8, 2012

(30) Foreign Application Priority Data
Sep. 29, 2009  (EP) ..................................... 09171699

(51) Int. Cl.
*F03B 13/10* (2006.01)
*H02G 9/02* (2006.01)
*F03B 13/26* (2006.01)

(52) U.S. Cl.
CPC  *H02G 9/02* (2013.01); *F03B 13/10* (2013.01); *F03B 13/264* (2013.01); *F05B 2230/60* (2013.01); *F05B 2240/917* (2013.01); *Y02E 10/28* (2013.01); *Y02E 10/38* (2013.01)

(58) Field of Classification Search
CPC ........... H02G 9/00; H02G 9/025; H02G 1/10; Y02E 10/20; Y02E 10/28; F03B 13/10; F03B 13/12; B63C 9/22; F16L 1/26

USPC .......... 60/504, 398, 716–719; 290/43, 53, 54, 290/4 A, 44, 4 R–4 D; 415/196; 174/DIG. 15; 310/71; 439/180; 294/66.1
See application file for complete search history.

(56) References Cited

U.S. PATENT DOCUMENTS

| 228,467 A | 6/1880 | Maclay |
| 928,536 A | 7/1909 | Pino |

(Continued)

FOREIGN PATENT DOCUMENTS

| CA | 2388513 | 8/2000 |
| CA | 2352673 | 1/2003 |

(Continued)

OTHER PUBLICATIONS

Megson, T.H.G. Structural and Stress Analysis. Elsevier. p. 101-113. 1996.*

(Continued)

*Primary Examiner* — Thomas Denion
*Assistant Examiner* — Laert Dounis
(74) *Attorney, Agent, or Firm* — Gardner, Linn, Burkhart & Flory, LLP

(57) ABSTRACT

The present invention provides a hydroelectric turbine system comprising an array of turbines in series and a cabling system for use in connecting together adjacent turbines in the array, the cabling system being designed to allow the majority of the cabling connecting adjacent turbines to be laid substantially in line with the direction of tidal flow in order to reduce stress on the cabling system when the turbines are deployed on the seabed at sites of high tidal flow.

2 Claims, 1 Drawing Sheet

(56) References Cited

U.S. PATENT DOCUMENTS

| | | | |
|---|---|---|---|
| 1,710,103 | A | 4/1929 | Nelson |
| 2,054,142 | A | 9/1936 | Sharp |
| 2,470,797 | A | 5/1949 | Thomas |
| 2,501,696 | A | 3/1950 | Souczek |
| 2,563,279 | A | 8/1951 | Rushing |
| 2,658,453 | A | 11/1953 | Walters |
| 2,782,321 | A | 2/1957 | Fischer |
| 2,792,505 | A | 5/1957 | Baudry |
| 2,874,547 | A | 2/1959 | Fiore |
| 3,078,680 | A | 2/1963 | Wapsala |
| 3,209,156 | A | 9/1965 | Struble, Jr. |
| 3,292,023 | A | 12/1966 | Korber |
| 3,342,444 | A | 9/1967 | Nelson |
| 3,355,998 | A | 12/1967 | Roemisch |
| 3,384,787 | A | 5/1968 | Schwartz |
| 3,422,275 | A | 1/1969 | Braikevitch et al. |
| 3,477,236 | A | 11/1969 | Burrus |
| 3,487,805 | A | 1/1970 | Satterthwaite et al. |
| 3,708,251 | A | 1/1973 | Pierro |
| 3,986,787 | A | 10/1976 | Mouton, Jr. et al. |
| 3,987,638 | A | 10/1976 | Burkhardt et al. |
| 4,095,918 | A | 6/1978 | Mouton et al. |
| 4,163,904 | A | 8/1979 | Skendrovic |
| 4,219,303 | A | 8/1980 | Mouton, Jr. et al. |
| 4,274,009 | A | 6/1981 | Parker, Sr. |
| 4,367,413 | A | 1/1983 | Nair |
| 4,421,990 | A | 12/1983 | Heuss et al. |
| 4,427,897 | A | 1/1984 | Migliori |
| 4,496,845 | A | 1/1985 | Ensign et al. |
| 4,523,878 | A | 6/1985 | Richart et al. |
| 4,541,367 | A | 9/1985 | Lindberg |
| 4,613,762 | A | 9/1986 | Soderholm |
| 4,720,640 | A | 1/1988 | Anderson |
| 4,740,711 | A | 4/1988 | Sato et al. |
| 4,744,697 | A | 5/1988 | Coppens |
| 4,744,698 | A | 5/1988 | Dallimer et al. |
| 4,810,135 | A | 3/1989 | Davenport et al. |
| 4,867,605 | A | 9/1989 | Myers et al. |
| 4,868,408 | A | 9/1989 | Hesh |
| 4,868,970 | A | 9/1989 | Schultz et al. |
| 4,990,810 | A | 2/1991 | Newhouse |
| 5,495,221 | A | 2/1996 | Post |
| 5,517,383 | A | 5/1996 | Webb |
| 5,592,816 | A | 1/1997 | Williams |
| 5,606,791 | A | 3/1997 | Fougere et al. |
| 5,609,441 | A | 3/1997 | Khachaturian |
| 5,656,880 | A | 8/1997 | Clark |
| 5,662,434 | A | 9/1997 | Khachaturian |
| 5,715,590 | A | 2/1998 | Fougere et al. |
| 5,800,093 | A | 9/1998 | Khachaturian |
| 5,998,905 | A | 12/1999 | Fougere et al. |
| 6,039,506 | A | 3/2000 | Khachaturian |
| 6,109,863 | A | 8/2000 | Milliken |
| 6,166,472 | A | 12/2000 | Pinkerton |
| 6,168,373 | B1 | 1/2001 | Vauthier |
| 6,232,681 | B1 | 5/2001 | Johnston et al. |
| 6,242,840 | B1 | 6/2001 | Denk et al. |
| 6,300,689 | B1 | 10/2001 | Smalser |
| 6,367,399 | B1 | 4/2002 | Khachaturian |
| 6,406,251 | B1 | 6/2002 | Vauthier |
| 6,409,466 | B1 | 6/2002 | Lamont |
| 6,445,099 | B1 | 9/2002 | Roseman |
| 6,476,709 | B1 | 11/2002 | Wuidart et al. |
| 6,612,781 | B1 | 9/2003 | Jackson |
| 6,648,589 | B2 | 11/2003 | Williams |
| RE38,336 | E | 12/2003 | Williams |
| 6,729,840 | B2 | 5/2004 | Williams |
| 6,756,695 | B2 | 6/2004 | Hibbs et al. |
| 6,770,987 | B1 | 8/2004 | Sogard et al. |
| 6,777,851 | B2 | 8/2004 | Maslov |
| 6,806,586 | B2 | 10/2004 | Wobben |
| 6,840,713 | B1 | 1/2005 | Schia et al. |
| 6,843,191 | B1 | 1/2005 | Makotinsky |
| 6,857,821 | B2 | 2/2005 | Steenhuis et al. |
| 6,894,416 | B1 * | 5/2005 | Leijon et al. ................ 310/196 |
| 6,957,947 | B2 | 10/2005 | Williams |
| 6,995,479 | B2 | 2/2006 | Tharp |
| 6,998,730 | B2 | 2/2006 | Tharp |
| 7,190,087 | B2 | 3/2007 | Williams |
| D543,495 | S | 5/2007 | Williams |
| 7,275,891 | B2 | 10/2007 | Owen et al. |
| 7,352,078 | B2 | 4/2008 | Gehring |
| 7,378,750 | B2 | 5/2008 | Williams |
| 7,425,772 | B2 | 9/2008 | Novo Vidal |
| 7,471,009 | B2 | 12/2008 | Davis et al. |
| 7,527,006 | B2 | 5/2009 | Khachaturian |
| 7,611,307 | B2 | 11/2009 | Owen et al. |
| 7,845,296 | B1 | 12/2010 | Khachaturian |
| 7,874,788 | B2 | 1/2011 | Stothers et al. |
| 8,310,077 | B2 * | 11/2012 | Pearce ...................... 290/54 |
| 2002/0034437 | A1 | 3/2002 | Williams |
| 2002/0062644 | A1 | 5/2002 | Rosefsky |
| 2002/0088222 | A1 | 7/2002 | Vauthier |
| 2003/0044272 | A1 | 3/2003 | Addie et al. |
| 2003/0137149 | A1 | 7/2003 | Northrup et al. |
| 2003/0155829 | A1 | 8/2003 | McMullen et al. |
| 2003/0168864 | A1 | 9/2003 | Heronemus et al. |
| 2003/0193198 | A1 | 10/2003 | Wobben |
| 2003/0218338 | A1 | 11/2003 | O'Sullivan et al. |
| 2004/0021386 | A1 | 2/2004 | Swett |
| 2004/0021437 | A1 | 2/2004 | Maslov et al. |
| 2004/0201299 | A1 | 10/2004 | Naritomi et al. |
| 2004/0227500 | A1 | 11/2004 | O'Meara |
| 2004/0232792 | A1 | 11/2004 | Enfourth |
| 2004/0262926 | A1 | 12/2004 | Hansen |
| 2005/0005592 | A1 | 1/2005 | Fielder |
| 2005/0031442 | A1 | 2/2005 | Williams |
| 2005/0073151 | A1 * | 4/2005 | Diamontopoulos ............ 290/42 |
| 2006/0261597 | A1 | 11/2006 | Gehring |
| 2007/0018459 | A1 | 1/2007 | Williams |
| 2007/0063448 | A1 | 3/2007 | Kowalczyk |
| 2007/0164626 | A1 | 7/2007 | Taniguchi et al. |
| 2007/0231072 | A1 | 10/2007 | Jennings et al. |
| 2007/0241566 | A1 | 10/2007 | Kuehnle |
| 2007/0262668 | A1 | 11/2007 | Brisson et al. |
| 2007/0291426 | A1 | 12/2007 | Kasunich et al. |
| 2008/0012538 | A1 | 1/2008 | Stewart et al. |
| 2009/0278357 | A1 | 11/2009 | Williams |
| 2010/0025998 | A1 | 2/2010 | Williams |
| 2010/0026002 | A1 | 2/2010 | Spooner |
| 2010/0068037 | A1 | 3/2010 | Ives |
| 2010/0133838 | A1 | 6/2010 | Borgen |
| 2010/0172698 | A1 | 7/2010 | Ives et al. |
| 2010/0201129 | A1 | 8/2010 | Holstein et al. |
| 2010/0232885 | A1 | 9/2010 | Ives et al. |
| 2010/0295388 | A1 | 11/2010 | Ives et al. |
| 2011/0018274 | A1 | 1/2011 | Ives et al. |
| 2011/0088253 | A1 | 4/2011 | Ives et al. |
| 2011/0110770 | A1 | 5/2011 | Spooner et al. |
| 2011/0291419 | A1 | 12/2011 | Dunne et al. |
| 2011/0293399 | A1 | 12/2011 | Dunne et al. |
| 2011/0298216 | A1 | 12/2011 | Ives et al. |
| 2011/0304148 | A1 | 12/2011 | Dunne et al. |
| 2012/0027522 | A1 | 2/2012 | Ives et al. |
| 2012/0175877 | A1 | 7/2012 | Ives et al. |
| 2012/0187680 | A1 | 7/2012 | Spooner et al. |
| 2012/0235412 | A1 | 9/2012 | Dunne et al. |

FOREIGN PATENT DOCUMENTS

| | | |
|---|---|---|
| CH | 260699 | 4/1947 |
| CH | 146935 | 8/1983 |
| DE | 3116740 | 11/1982 |
| DE | 3638129 | 5/1988 |
| DE | 3718954 | 12/1988 |
| DE | 19948198 | 4/2001 |
| DE | 10101405 | 7/2002 |
| DE | 20308901 | 9/2003 |
| DE | 10244038 | 4/2004 |
| DE | 102007016380 | 10/2008 |
| EP | 1318299 | 12/2003 |
| EP | 1564455 | 1/2005 |
| EP | 1691377 | 2/2006 |
| EP | 1876350 | 1/2008 |

(56) References Cited

FOREIGN PATENT DOCUMENTS

| | | |
|---|---|---|
| EP | 1878912 | 1/2008 |
| EP | 1878913 | 1/2008 |
| EP | 1879280 | 1/2008 |
| EP | 1878911 | 9/2008 |
| EP | 1992741 | 11/2008 |
| EP | 1885047 | 12/2008 |
| EP | 1980670 | 7/2009 |
| EP | 2088311 | 8/2009 |
| EP | 2110910 | 10/2009 |
| EP | 2112370 | 10/2009 |
| EP | 1980746 | 6/2010 |
| EP | 2199199 | 6/2010 |
| EP | 2199598 | 6/2010 |
| EP | 2199599 | 6/2010 |
| EP | 2199601 | 6/2010 |
| EP | 2199602 | 6/2010 |
| EP | 2199603 | 6/2010 |
| EP | 2200170 | 6/2010 |
| EP | 2071709 | 9/2010 |
| EP | 2209175 | 9/2010 |
| EP | 2241749 | 10/2010 |
| EP | 2302204 | 3/2011 |
| EP | 2302755 | 3/2011 |
| EP | 2302766 | 3/2011 |
| FR | 2823177 | 10/2002 |
| FR | 2859495 | 3/2005 |
| GB | 204505 | 10/1923 |
| GB | 924347 | 4/1963 |
| GB | 980575 | 1/1965 |
| GB | 1131352 | 10/1968 |
| GB | 1413835 | 11/1975 |
| GB | 2316461 | 2/1998 |
| GB | 2344843 | 6/2000 |
| GB | 2408294 | 5/2005 |
| GB | 2431628 | 5/2007 |
| GB | 2434413 | 7/2007 |
| GB | 2447514 | 9/2008 |
| JP | 59203881 | 11/1984 |
| JP | 63055370 | 3/1988 |
| JP | 01043908 | 2/1989 |
| JP | 2000341818 | 12/2000 |
| JP | 2005069025 | 3/2005 |
| JP | 2005248822 | 9/2005 |
| JP | 2006094645 | 4/2006 |
| JP | 2007255614 | 10/2007 |
| JP | 2007291882 | 11/2007 |
| WO | WO9844372 | 10/1998 |
| WO | WO9852819 | 11/1998 |
| WO | WO9966623 | 12/1999 |
| WO | WO0077393 | 12/2000 |
| WO | 0134973 A1 | 5/2001 |
| WO | WO0134977 | 5/2001 |
| WO | WO02099950 | 12/2002 |
| WO | 03014561 A1 | 3/2003 |
| WO | WO03025385 | 3/2003 |
| WO | WO03046375 | 6/2003 |
| WO | WO2004015264 | 2/2004 |
| WO | WO2004027257 | 4/2004 |
| WO | WO2004107549 | 12/2004 |
| WO | WO2004113717 | 12/2004 |
| WO | WO2005045243 | 5/2005 |
| WO | WO2005061887 | 7/2005 |
| WO | WO2005078233 | 8/2005 |
| WO | WO2005080789 | 9/2005 |
| WO | WO2005116443 | 12/2005 |
| WO | WO2006029496 | 3/2006 |
| WO | WO2007043894 | 4/2007 |
| WO | WO2007055585 | 5/2007 |
| WO | WO2007083105 | 7/2007 |
| WO | WO2007086814 | 8/2007 |
| WO | WO2007125349 | 11/2007 |
| WO | WO2008004877 | 1/2008 |
| WO | WO2008006614 | 1/2008 |
| WO | WO2008050149 | 5/2008 |
| WO | 2008081187 A2 | 7/2008 |
| WO | WO 2009016409 A2 * | 2/2009 |
| WO | WO2010118766 | 10/2010 |
| WO | WO2011039249 | 4/2011 |
| WO | WO2011039255 | 4/2011 |
| WO | WO2011039267 | 7/2011 |

OTHER PUBLICATIONS

International Search Report (Oct. 26, 2010) and Written Opinion (Oct. 26, 2010) of the International Searching Authority from corresponding Patent Cooperation Treaty (PCT) Application No. PCT/EP2010/064459.

* cited by examiner

HYDROELECTRIC TURBINE CABLING SYSTEM

FIELD OF THE INVENTION

This invention relates to a hydroelectric turbine system consisting of an array of turbines in series and a cabling system for use in connecting together turbines in the array, and in particular a cabling system which embodies a number of advantages when installing or retrieving a hydroelectric turbine from the seabed, and which results in reduced stress on the cabling system when the turbines are deployed on the seabed at sites of high tidal flow.

BACKGROUND OF THE INVENTION

Renewable energy has in recent years received significant attention, primarily due to the environmental damage which has been inflicted on the planet as a result of our need for energy and resultant use of fossil fuels. The race is therefore on to develop new and improved forms of renewable energy, in particular forms of renewable energy which can satisfy this ever increasing demand for energy, as many forms of renewable energy are not scalable in order to produce energy at commercial levels.

One area which shows significant potential is that of tidal energy, which has the ability to provide consistent and high levels of energy without negative impacts on the environment and which is essentially available around the entire planet. However there are numerous difficulties which are encountered when seeking to harness tidal energy. The present application is concerned with hydroelectric turbines mounted on the seabed for extracting energy from tidal flows. Along with the difficulties of locating one or more of such turbines in suitable locations on the seabed, it is then necessary to electrically connect the turbines to shore, in order to allow the extraction of electrical energy therefrom. In addition, in order to generate commercial levels of energy, it will generally be necessary to connect together an array of these turbines in order to produce sufficient levels of energy. This operation requires the use of significant lengths of electrical cabling, which is difficult to work with, in particular at sites of high tidal flow at which the turbines are to be located.

Due to both the relatively large electric currents generated by hydroelectric turbines, and the extremely harsh conditions under which the turbines and associated electrical cables are exposed, the electrical cable extending onshore from the turbine array and between each turbine in the array must be relatively large and robust. As a result of the diameter of the cable, which may be in the region of 300-500 mm, and given the length of cable involved, the weight of the cable is significant. The handling of the cable is therefore both a difficult and time-consuming operation, made even more difficult by the tidal conditions present at the sites where hydroelectric turbines are deployed. It is therefore of utmost importance to prevent any damage to the cable during the lifetime of the turbine array, as the task of replacing the cabling is both time consuming, dangerous, and costly.

It is therefore an object of the present invention to overcome the above mentioned problems and to avoid or minimize damage to the cable during the lifetime of same.

SUMMARY OF THE INVENTION

According to a first aspect of the present invention there is provided a hydroelectric turbine system comprising at least one turbine comprising a stator and a rotor mounted for rotation within the stator; and at least a first cable extending from the turbine in a direction substantially parallel to an axis of rotation of the rotor.

Preferably, the system comprises a second cable extending from the turbine in a direction substantially parallel to the axis of rotation of the rotor.

Preferably, the second section of cable is longer than the first section of cable.

Preferably, the turbine comprises an electrical connector having a first portion connected to the first cable, and a cooperating second portion connected to the second cable.

Preferably, the system comprises an array of the turbines connected together in series, wherein the first cable of one turbine is connected to the second cable of an adjacent turbine.

According to a second aspect of the present invention there is provided a method of electrically connecting an array of hydroelectric turbines, the method comprising laying a first cable from one turbine in a direction substantially in line with the direction of tidal flow; laying a second cable from an adjacent turbine in a direction substantially in line with the direction of tidal flow; and establishing an electrical connection between the first and second cables of the adjacent turbines.

Preferably, the electrical connection between the first and second cables is established at a position where the first and second cables are running substantially in line with the direction of tidal flow.

Preferably, the second cable is longer than the first cable.

Preferably, the electrical connection is established by providing each turbine with an electrical connector having a first portion connected to the first cable, and a cooperating second portion connected to the second cable; and joining the first portion of one turbine with the second portion of an adjacent turbine.

As used herein, the term "hydroelectric turbine" is intended to mean either a hydroelectric turbine mounted on a base, which can be lowered together onto the seabed; the base in isolation from the turbine, which may be lowered to the seabed and the turbine subsequently lowered into position onto the base; or the turbine in isolation from the base, to be lowered onto the previously located base.

DETAILED DESCRIPTION OF THE DRAWINGS

Referring now to the accompanying drawings there is illustrated a hydroelectric turbine system in the form of an array, generally indicated as 10, to be deployed on the seabed in order to generate electrical energy by extracting mechanical power from the tidal flow of water through the turbines and converting same to electrical energy.

Figure 1:
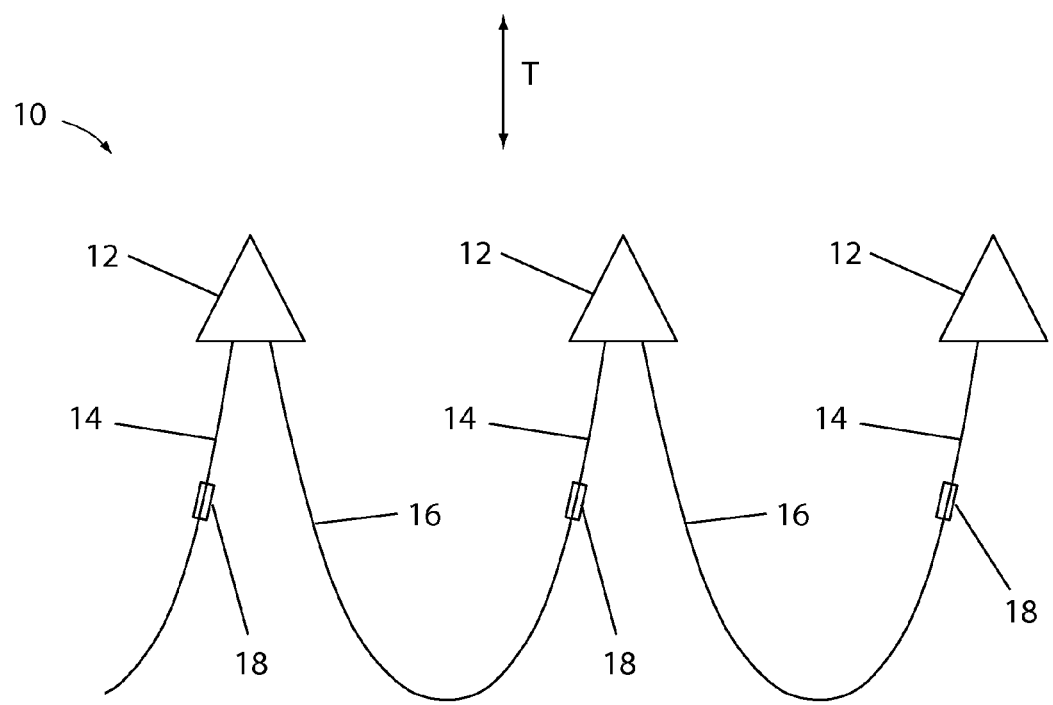
FIG. 1 illustrates a schematic representation of an array of hydroelectric turbines according to the present invention, connected together in series.

The array 10 comprises a plurality of turbines 12, three shown in FIG. 1, each of which comprises a rotor (not shown) which undergoes rotation in response to the tidal flow of water through the turbines, which rotation is converted into electrical energy by suitable means. For example, each turbine 12 may include an array of coils and magnets (not shown) which due to the rotation of the turbine's rotor, undergo relative movement and as result generate electricity in known fashion.

The turbines 12 must therefore be suitably aligned with the direction of tidal flow T, in order to extract maximum energy from the tidal flow.

The turbines 12 in the array 10 are connected together in series and, in the embodiment illustrated are positioned spaced from one another and extending in a line substantially perpendicular to the direction of tidal flow T. It will be appreciated that more turbines 12 may be provided in the array 10, for example in a rectangular array of rows and columns, although the particular configuration may be dictated by the site at which the array 10 is located. Each turbine 12 comprises a first cable 14 extending therefrom and a second cable 16 also extending from the turbine 12. The cables 14, 16 may extend directly from the turbine 12, or alternatively from a base (not shown) on which the turbine 12 is mounted. These cables 14, 16 preferably extend from the turbine 12, in use, in a direction substantially parallel to the direction of tidal flow T. Thus in use the cables 14, 16 extend substantially parallel to an axis of rotation of the turbine 12, or more accurately an axis of rotation of a rotor (not shown) of the turbine 12. In addition, each of the cables 14, 16 preferably extend from the same side of the respective turbine 12.

Figure 2:
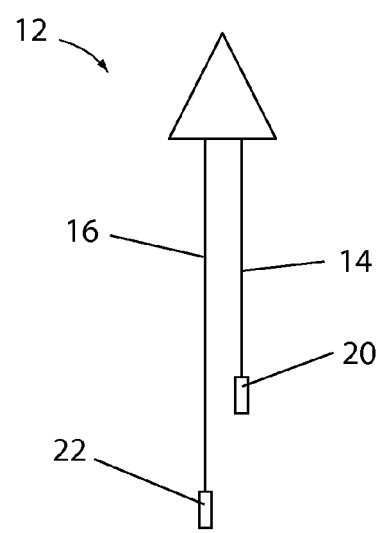
FIG. 2 illustrates a schematic representation of one of the hydro electric turbines in isolation.

Referring to FIG. 2 it can be seen that the second cable 16 is greater in length than the first cable 14, the reasons for which are set out herein after in detail. When connected together in the array 10, the first cable 14 of one turbine 12 is connected to the second cable 16 of the adjacent turbine 12, and so on.

In order to allow the connection of adjacent turbines 12, each turbine 12 is provided with an electrical connector 18. Each electrical connector 18 comprises the first portion 20 mounted to the free end of the first cable 14 and a second portion 22 mounted to the free end of the second cable 16. The first portion 20 and the second portion 22 are connectable to one another, in order to provide an electrical connection that is both mechanically robust and water tight. The connectors 18 may take any suitable form.

In connecting adjacent turbines 12, the first and second cables 14, 16 are positioned to extend rearwardly from the respective turbine 12, in a direction substantially parallel to the direction of tidal flow T, and therefore substantially parallel to an axis of rotation of the turbine 12. The longer second cable 16 is then brought around in an arc to meet the end of the first cable 14 of the adjacent turbine 12. The first portion 20 and the second portion 22 of the cables 14, 16 are then connected to one another in order to join the turbines 12. This process is repeated for each adjacent turbine 12. In this way each of the cables 14, 16 extend primarily in a direction substantially parallel to the direction of tidal flow, with only a small arc of the cable running across the direction of tidal flow T. In this way, during operation the majority of the length of the cables 14, 16 are running in line with the tide, thereby minimising the forces acting on the cables 14, 16 from the tide. This arrangement will require the use of a greater length of cable 14, 16 extending between each turbine 12 in the array 10, the use of a straight line of cable between each turbine 12, perpendicular to the direction of tidal flow T, providing the shortest and most obvious path between adjacent turbines 12. However, the use of the above arrangement of cabling 14, 16 running predominantly in line with the tide avoids the possibility of tidal induced vibration and/or movement of the cable which can lead to wear of the cable and ultimately failure.

By providing the second cable 16 longer than the first cable 14, the connectors 18 are also positioned on a straight section of cable once the array 10 is connected in series. If the first and second cables 14, 16 were equal in length, the connector 18 would be positioned at the point along the cabling running directly perpendicular to the direction of tidal flow T. This would result in maximum stress being applied to the connector 18 during operation of the array 10, resulting in bending thereof and possibly damage and/or failure. By keeping the connector 18 on the straight section this stress and bending is minimised, thus avoiding or at least significantly reducing the possibility of damage thereto.

The invention claimed is:

1. A hydroelectric turbine system comprising:
    an array of turbines connected together in series, each turbine comprising a stator and a rotor mounted for rotation about an axis within the stator;
    a first cable extending from the turbine in a direction parallel to an axis of rotation of the rotor;
    a second cable extending from the turbine in a direction parallel to the axis of rotation of the rotor, wherein the second section of cable is longer than the first section of cable; and
    an electrical connector having a first portion connected to the first cable, and a cooperating second portion connected to the second cable;
    wherein the first cable of one turbine is connected to the second cable of an adjacent turbine.

2. A method of electrically connecting an array of hydroelectric turbines, the method comprising:
    laying a first cable from one turbine in a direction in line with the direction of tidal flow;
    laying a second cable which is longer than the first cable from an adjacent turbine in a direction in line with the direction of tidal flow;
    establishing an electrical connection between the first and second cables of the adjacent turbines at a position where the first and second cables are running in line with the direction of tidal flow by providing each turbine with an electrical connector having a first portion connected to the first cable, and a cooperating second portion connected to the second cable; and joining the first portion of one turbine with the second portion of an adjacent turbine.

* * * * *